United States Patent [19]

Oshikoshi et al.

[11] Patent Number: 4,656,526
[45] Date of Patent: Apr. 7, 1987

[54] PLANE COLOR IMAGE SCANNING AND READING METHOD

[75] Inventors: Yuji Oshikoshi, Minamiashigara; Takashi Fukui, Tokyo, both of Japan

[73] Assignee: Fuji Photo Film Co. Ltd., Kanagawa, Japan

[21] Appl. No.: 742,145

[22] Filed: Jun. 7, 1985

[30] Foreign Application Priority Data

May 22, 1981 [JP] Japan ............................... 56-78330

[51] Int. Cl.$^4$ .................... H04N 1/024; H04N 9/14
[52] U.S. Cl. ................................. 358/294; 358/75
[58] Field of Search ............... 356/402, 407, 420; 358/75, 80, 285, 293, 294

[56] References Cited

U.S. PATENT DOCUMENTS

| 3,622,690 | 11/1971 | Stephens et al. | 358/80 |
| 4,149,183 | 4/1979 | Pellar et al. | 358/75 |
| 4,274,109 | 6/1981 | Whitby | 358/75 X |

FOREIGN PATENT DOCUMENTS 3832  1/1978  Japan ................................. 358/285

OTHER PUBLICATIONS

Meyerhofer et al., *IEEE Transactions on Communication Technology*, vol. COM-18, No. 4, Aug. 1970, pp. 361–366.

Gosch, *Electronics*, vol. 53, No. 11, May 8, 1980, pp. 77 and 78.

Primary Examiner—F. L. Evans
Attorney, Agent, or Firm—Gerald J. Ferguson, Jr.; Michael P. Hoffman; Ronni S. Malamud

[57] ABSTRACT

In a method of scanning and reading out a plane color image, a first laser beam having a wavelength within the 460–520 nm bluish green wavelength region, where the spectral reflectances of the yellow and magenta components of the color image are approximately identical with each other, is superposed upon a second laser beam having a wavelength within the 550–800 nm red wavelength region and capable of detecting the cyan component of the color image. Or, a first laser beam having a wavelength within the 540–600 nm green wavelength region, where the spectral absorbances of the magenta and cyan components are approximately identical with each other, is superposed upon a second laser beam having a wavelength within the 400–500 nm blue wavelength region and capable of detecting the yellow component. The color image is scanned with the superposed laser beams to read out the color image.

2 Claims, 4 Drawing Figures

SPECTRAL REFLECTANCE OF INK
(CYAN, MAGENTA, YELLOW)

SPECTRAL REFLECTANCE OF COLOR
TONER (CYAN, MAGENTA, YELLOW)

PLANE COLOR IMAGE SCANNING AND READING METHOD

This application is a divisional of Ser. No. 378,179, filed May 14, 1982, now abandoned.

BACKGROUND OF THE INVENTION

1. Field of the Invention

This invention relates to a method of reading out a color image by scanning the color image with light beams.

2. Description of the Prior Art

In conventional methods of scanning and reading out color images, a white light beam or a laser beam is used for scanning the color images. In the method using a white beam for scanning, the white beam reflected from the original carrying a color image is detected by use of a three-color separation filter and three photomultipliers, or by using a three-color separation filter and a mono-directional solid state image pickup device such as a charge coupled device line sensor (CCD line sensor). However, the method in which the reflected light beam is detected with a three-color separation filter and three photomultipliers is disadvantageous in that it cannot be used for a plane scanning system. On the contrary, the latter method in which the reflected light beam is detected with a three-color separation filter and a mono-directional solid state image pickup device can be used for the plane scanning system. However, commercially available mono-directional solid state image pickup devices have a small number of picture elements and cannot read an image of a large size (like, for example, Japanese B4 size). To read a large size image, it is necessary to connect a plurality of mono-directional solid state image pickup devices and to match the connecting points with high accuracy. This makes it difficult to put the latter method into practical use.

On the other hand, as for the above-mentioned method using a laser beam for scanning, it is known to coaxially superpose an He-Cd laser beam (wavelength 441.6 nm), an Ar laser beam (wavelength 514 nm) and an He-Ne laser beam (wavelength 632.8 nm) for use as the scanning light beam. It is also known to use an He-Ne laser beam only, or to use an Ar laser beam only.

These conventional methods using a laser beam for scanning can be effectively used for the plane scanning system and do not present the above-mentioned difficulty with respect to the manufacture process of the devices. However, the method in which coaxially superposed laser beams are used for scanning is disadvantageous in that three laser sources must be used and, therefore, the method is expensive to conduct, and that the life of the He-Cd laser source is short. On the other hand, the method using only an He-Ne laser beam beam or an Ar laser beam is inexpensive to conduct because it requires only one laser source. However, the method using the He-Ne laser beam only cannot read out yellow and magenta, while the method using the Ar laser beam only cannot read out cyan.

SUMMARY OF THE INVENTION

The primary object of the present invention is to provide a method of reading out a color image by scanning it with laser beams.

Another object of the present invention is to provide a method of reading out a color image by scanning it with laser beams, which can be conducted in an inexpensive manner.

The specific object of the present invention is to provide a method of scanning and reading out a plane color image, which can detect all the color components of the color image by use of the minimum number of laser sources.

A color image is generally reproduced by silver salt color photography, color electronic photography, color printing, or the like. In these processes, the color image is reproduced by a combination of dyes of color-sensitive material, pigments or dyes of toner or printing ink, which correspond to cyan, magenta and yellow respectively (these dyes or pigments are hereinafter referred to as cyan, magenta, and yellow components.).

It has been found that, in the spectral reflection characteristics of the cyan, magenta and yellow components, there is a special wavelength region where the spectral reflectances of the yellow and magenta components are approximately the same while the spectral reflectance of the cyan component is substantially higher than those of the yellow and magenta components, and there is another special wavelength region where the spectral reflectances of the magenta and cyan components are approximately the same while the spectral reflectance of the yellow component is substantially higher. Thus the present invention is characterized by reading out a color image by use of two laser beams in such a manner that the yellow and magenta components or the magenta and cyan components of the image are read out by one laser beam, and the remaining yellow or cyan component is read out by the other laser beam.

Namely, the method of scanning and reading out a plane color image in accordance with the present invention comprises coaxially superposing a first laser beam which has a wavelength within the 460–520 nm bluish green wavelength region, where the spectral reflectances of the yellow and magenta components are approximately the same while the spectral reflectance of the cyan component is substantially higher, and which can detect both the yellow and magenta components of the color image, upon a second laser beam having a wavelength within the 550–800 nm red wavelength region and capable of detecting the cyan component of the color image, or coaxially superposing a first laser beam which has a wavelength within the 540–600 nm green wavelength region, where the spectral absorbances of the magenta and cyan components are approximately the same while the spectral reflectance of the yellow component is substantially higher, and which can detect both the magenta and cyan components of the color image, upon a second laser beam having a wavelength within the 400–500 nm blue wavelength region and capable of detecting the yellow component of the color image; scanning the color image with the two laser beam superposed one upon the other, and reading out the color image.

In the method of the present invention, two kinds of color components of the plane color image are detected and read out by one laser beam, and the remaining one kind of color component of the plane color image is read out by the other laser beam. Accordingly, all the color components of the color image can be detected with two laser beams, and the color image can be precisely read out at a reduced cost.

DESCRIPTION OF THE PREFERRED EMBODIMENTS

The present invention will hereinbelow be described in further detail with reference to the accompanying drawings.

Figure 4:
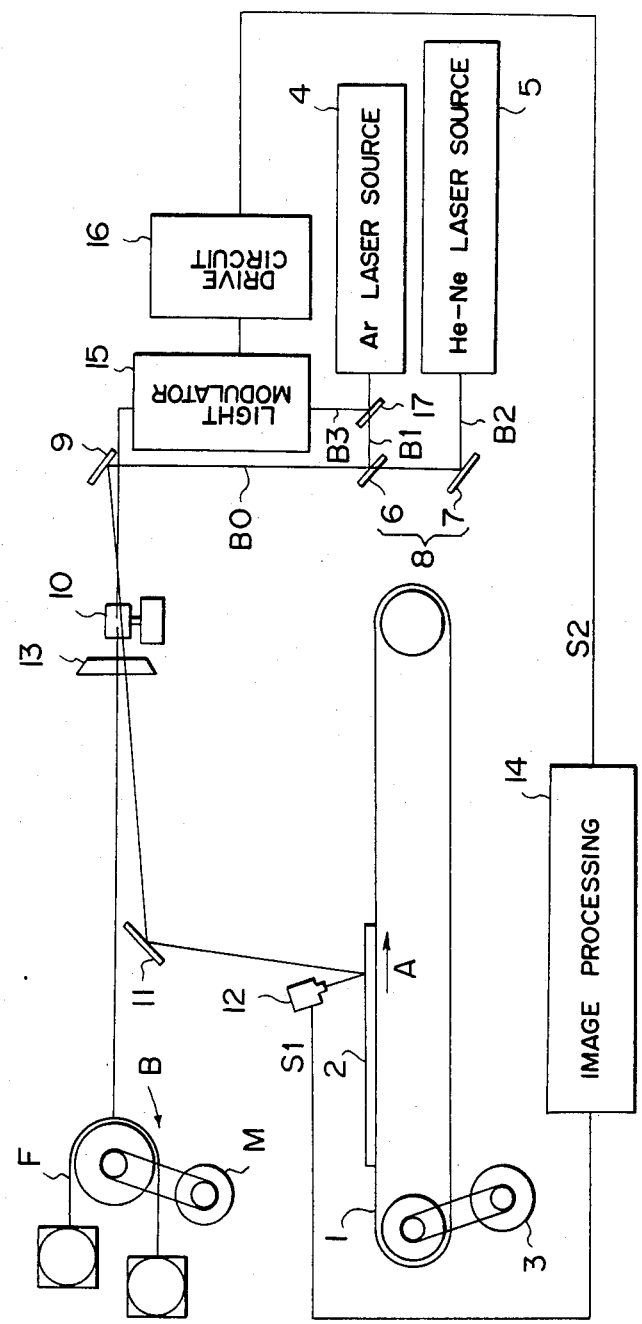
FIG. 4 is a schematic view showing the whole system of the image scanning and recording system in which an embodiment of the image scanning and reading-out system for conducting the method in accordance with the present invention is employed.

FIG. 4 schematically shows the whole system of the image scanning and recording system embodying the image scanning and reading-out system for conducting the method in accordance with the present invention.

In FIG. 4, an endless belt 1 supports a plane color original 2, which is to be read out and reproduced, and moves it in the direction of arrow A. The endless belt 1 is driven by a motor 3. As mentioned above, the original 2 may be a color original obtained by silver salt photography, electronic photography, printing, or the like.

The reference numeral 4 designates an Ar laser source, and 5 an He-Ne laser source. The Ar laser source 4 emits a first laser beam B1 having a wavelength within the 460-520 nm bluish green wavelength region where the spectral absorbances of the yellow and magenta components of the color image on the color original 2 are approximately identical with each other. The Ar laser source 4 may be of air-cooled type having an output capacity of 10 mW and capable of emitting light having a wavelength of 488 nm or 514 nm. The He-Ne laser source 5 emits a second laser beam B2 having a wavelength within the 550-800 nm red wavelength region and capable of detecting the cyan component of the color image on the color original 2. The He-Ne laser source 5 may be of the type having an output capacity of 5 mW and emitting light having a wavelength of 632.8 nm.

In front of the laser sources 4 and 5 is positioned an optical axis matching optical system 8 consisting of a semitransparent mirror 6 and a reflecting mirror 7. The optical axis matching optical system 8 coaxially superposes the first laser beam B1 upon the second laser beam B2 to form a reading out beam B0.

The reading out beam B0 formed by coaxially superposing the first and second laser beams B1 and B2 is directed to a light deflector 10 such as galvanometer mirror by a reflecting mirror 9. The light deflector 10 deflects the reading-out beam B0 via a reflecting mirror 11 onto the original 2, which is being moved in the direction of arrow A by the endless belt 1, so as to scan the original 2 perpendicularly to the direction of arrow A. The direction of arrow A is usually called the sub-scanning direction, and the direction perpendicular to arrow A is called the main scanning direction.

Above the original 2 is located a light receiver 12 which receives the reading out beam B0 reflected from the original 2, converts the reflected light into an electric original density signal S1, and sends the signal S1 to an image processing circuit 14. After the light deflector 10 is positioned a lens 13 to sufficiently reduce the laser beam diameter so as to form a small light spot for the main scanning on the original 2.

In this way, the color image on the color original 2 is read out in accordance with the present invention.

The output terminal of the light receiver 12 is connected to the input terminal of the image processing circuit 14. Thus the original density signal S1 is sent from the light receiver 12 to the image processing circuit. The image processing circuit 14 processes the original density signal S1 with respect to gradation, dot or the like to generate an image signal S2. The image signal S2 is sent to a drive circuit 16 for a light modulator 15 used for on-off laser beam modulation. Between the semi-transparent mirror 6 and the Ar laser source 4 is positioned a beam splitter 17 which splits the first beam B1 emitted from the Ar laser source 4 to form a writing beam B3 and send it to the light modulator 15. The drive circuit 16 drives and controls the light modulator 15 according to the image signal S2 to achieve on-off modulation of the writing beam B3. The on-off modulated writing beam B3 scans a monochromatic photosensitive recording medium F, which is moved by a motor M in the sub-scanning direction indicated by arrow B. This scanning is conducted by the light deflector 10 perpendicularly to the direction of arrow B, i.e. in the main scanning direction, thereby to record the image signal on the recording medium F. Since the writing beam B3 has a wavelength of 488 nm, it is preferable that an orthochromatic photosensitive material be used as the monochromatic photosensitive recording medium F.

Figure 1:
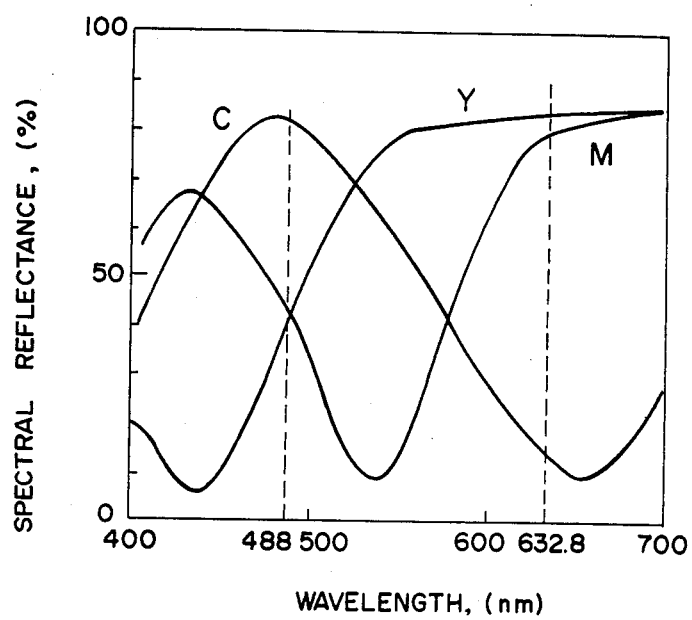
FIGS. 1, 2 and 3 are graphs respectively showing the spectral reflectance characteristics of dyes of color-sensitive material, pigments or dyes of toner and printing ink, which correspond to cyan, magenta and yellow.
Figure 2:
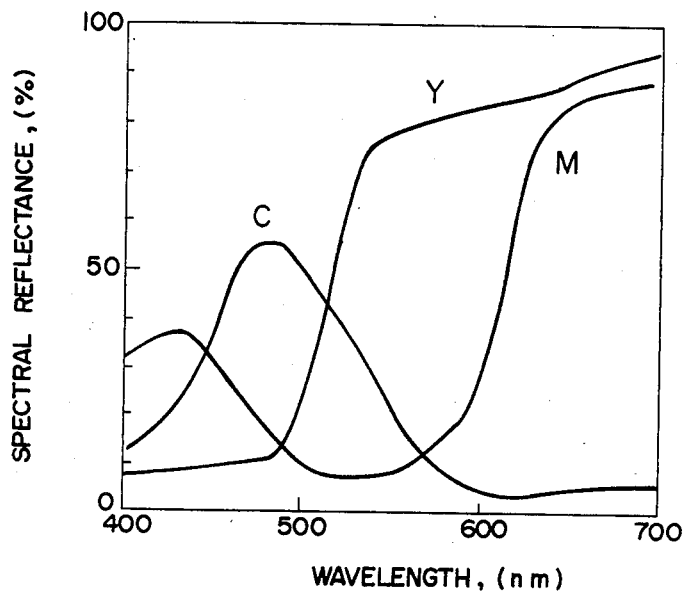
Figure 3:
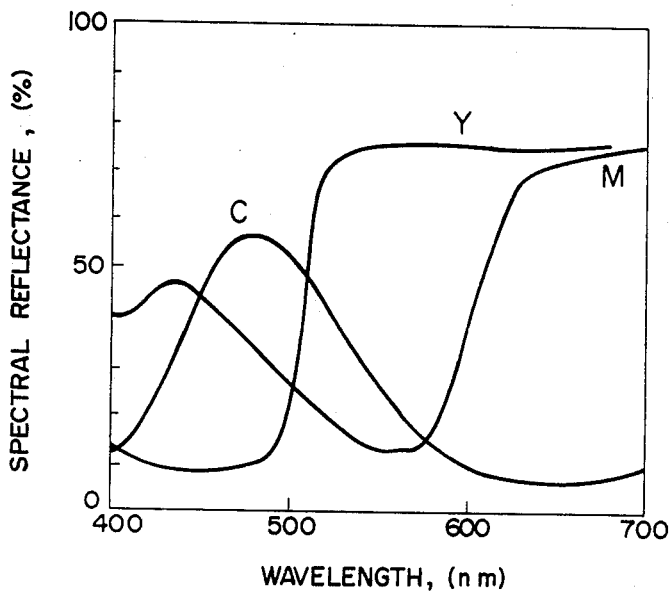

As described above, the spectral reflectance characteristics of the respective color components, i.e. the cyan, magenta and yellow components are as shown in FIGS. 1, 2 and 3. Accordingly, in the above-described image scanning and reading out method and the recording method, the ratio of the reflectances of the cyan, magenta and yellow components respectively to the Ar laser beam having a wavelength of 488 nm is about 1:1/2:1/2. The ratio of the reflectances of these color components to the He-Ne laser beam having a wavelength of 632.8 nm is about 0:1:1. Therefore, when the Ar laser beam and the He-Ne laser beam have an identical intensity, the total reflectance ratio among the cyan, magenta and yellow components is 1:3/2:3/2. In this case, the intensities of the reflected lights are uneven among the respective color components, and the image cannot be satisfactorily read out and recorded. To solve this problem, an ND filter may be located after the He-Ne laser source to set the intensity of the He-Ne laser beam emitted from the He-Ne laser source to one half that of the Ar laser beam. In this way, the ratio of the intensities of the Ar laser beam reflected by the cyan, magenta and yellow components is set to about 1:1/2:1/2 and the ratio of those of the He-Ne laser beam reflected by the respective components is set to about 0:1/2:1/2 (provided that the intensity of the Ar laser beam reflected by the cyan component is taken as 1), thereby to obtain a total ratio of reflected light intensities of 1:1:1. Alternatively, the transmittance of the semi-transparent mirror 6 may be decreased to one half, whereby the intensity of the transmitted He-Ne laser beam will be halved.

In the above-described embodiment of the plane color original scanning and reading-out method in accordance with the present invention, the Ar laser beam (wavelength 488 nm) and the He-Ne laser beam (wavelength 632.8 nm) are used as the two laser beams for scanning and reading out the color original. However, it is also possible to use, as the two laser beams, a first laser beam which has a wavelength within the 540-600 nm green wavelength region, where the spectral absorbances of the magenta and cyan components of the color components are approximately identical with each other, and which can detect both the magenta and cyan components of the color image together, and a second laser beam having a wavelength within the 400–500 nm blue wavelength region and capable of detecting the yellow component of the color image. In this case, the magenta and cyan components of the color image are detected by use of the first laser beam, and the yellow component of the color image is detected with the second laser beam. Thus all the color components can be detected completely. The source of the first laser beam may be a Kr (krypton) laser source capable of emitting light having a wavelength of 568.2 nm, and the source of the second laser beam may be an He-Cd laser source capable of emitting light having a wavelength of 441.6 nm or an Ar laser beam capable of emitting light having a wavelength of 488 nm.

As described above, the plane color image reading-out method in accordance with the present invention can read out all the color components of the color image by use of two laser beams. When the method in accordance with the present invention is used for recording the image on a monochromatic photosensitive recording material, it is possible to obtain a monochromatic image precisely reproduced from the color original.

We claim:

1. A method of scanning and reading out a plane color image including cyan, magenta and yellow color components comprising: disposing said plane color image in a scanning plane; balancing the intensities of a first laser beam having a wavelength of 488 nm emitted from an argon laser source and a second laser beam having a wavelength of 632.8 nm emitted from an He-Ne laser source to a predetermined ratio in response to the balance of the spectral reflectance characteristics of the cyan, magenta and yellow color components of said plane color image; coaxially superposing a first laser beam having a wavelength of 488 nm emitted from an argon laser source upon a second laser beam having a wavelength of 632.8 nm emitted from an He-Ne laser source to form a composite laser beam; impinging said composite laser beam upon a moving light deflector to deflect said composite laser beam to said plane color image and to effect a one-dimensional scan thereof for a main scan; moving said plane color image within said scanning plane in a direction perpendicular to said one dimensional scan for a sub-scan, thereby scanning said color image with said two laser beams superposed one upon the other; receiving light reflected from said color image without effecting a color separation by means of a single light receiver, said single light receiver generating a density signal in response to the intensity of the reflected light; modulating a recording beam with reference to said density signal; and impinging said recording beam upon a monochromatic photosensitive recording material to obtain a monochromatic image.

2. The method as defined in claim 1, wherein the intensity of said first laser beam is approximately twice that of said second laser beam.

* * * * *